(12) United States Patent
Kim et al.

(10) Patent No.: US 12,051,880 B2
(45) Date of Patent: Jul. 30, 2024

(54) BOARD CASE AND DISPLAY APPARATUS INCLUDING THE SAME

(71) Applicant: SAMSUNG ELECTRONICS CO., LTD., Suwon-si (KR)

(72) Inventors: Dongoh Kim, Suwon-si (KR); Jongpil Seo, Suwon-si (KR); Dongchan Lee, Suwon-si (KR); Youngchan Lee, Suwon-si (KR); Jiseok Jung, Suwon-si (KR); Minwoo Cha, Suwon-si (KR); Yoongoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 666 days.

(21) Appl. No.: 17/194,901

(22) Filed: Mar. 8, 2021

(65) Prior Publication Data

US 2021/0280992 A1    Sep. 9, 2021

(30) Foreign Application Priority Data

Mar. 6, 2020    (KR) .......................... 10-2020-0028532

(51) Int. Cl.
*H01R 4/20*    (2006.01)
*H01R 13/52*    (2006.01)
(Continued)

(52) U.S. Cl.
CPC ........... *H01R 4/20* (2013.01); *H01R 13/5216* (2013.01); *H02G 3/22* (2013.01); *H02G 15/013* (2013.01)

(58) Field of Classification Search
CPC ........ H01R 4/20; H01R 13/5216; H02G 3/22; H02G 15/013; H02G 3/083; H05K 5/069; H05K 5/03; G09F 9/30
See application file for complete search history.

(56) References Cited

U.S. PATENT DOCUMENTS 8,109,580 B1 *  2/2012  Didier .................... G09F 19/22
                                                  312/7.2
2006/0042814 A1  3/2006  Ball et al.
(Continued)

FOREIGN PATENT DOCUMENTS

JP    2844993       10/1998
KR    10-1862849    7/2018

OTHER PUBLICATIONS

International Search Report on Jun. 30, 2021 in corresponding application No. PCT/KR2021/002673.
(Continued)

*Primary Examiner* — Abdullah A Riyami
*Assistant Examiner* — Nader J Alhawamdeh
(74) *Attorney, Agent, or Firm* — STAAS & HALSEY LLP

(57) ABSTRACT

A display apparatus including a housing, a display module arranged inside the housing to display an image, a printed circuit board (PCB) connected to a plurality of cables provided to be electrically connected to the display module, a board case having a receiving space formed within the board case, the receiving space accommodating the PCB, and a cable clamp arranged on the board case to close a side of the receiving space, wherein the cable clamp includes a body, a first cut which is cut from a side of the body, a plurality of second cuts branched from an end of the first cut, and a plurality of through holes formed at one ends of the plurality of second cuts and passing through the body, each through hole having one of the plurality of cables inserted to and coupled with the through hole.

20 Claims, 11 Drawing Sheets

(51) Int. Cl.
*H02G 3/22* (2006.01)
*H02G 15/013* (2006.01)

(56) References Cited

U.S. PATENT DOCUMENTS

| | | | | |
|---|---|---|---|---|
| 2009/0147175 A1* | 6/2009 | Tsumura | ............... | G06F 1/1601 |
| | | | | 349/58 |
| 2012/0268449 A1 | 10/2012 | Choi et al. | | |
| 2014/0376757 A1* | 12/2014 | Engle | ....................... | H05K 7/00 |
| | | | | 174/50.54 |
| 2017/0194780 A1* | 7/2017 | Simon | ..................... | H02G 7/12 |
| 2021/0280992 A1* | 9/2021 | Kim | ..................... | H02G 15/013 |

OTHER PUBLICATIONS

Korean Office Action dated Feb. 15, 2024, for Korean Application No. 10-2020-0028532.

* cited by examiner

BOARD CASE AND DISPLAY APPARATUS INCLUDING THE SAME

CROSS-REFERENCE TO RELATED APPLICATION

This application is based on and claims priority under 35 U. S. C. § 119 to Korean Patent Application No. 10-2020-0028532 filed on Mar. 6, 2020, the disclosure of which is incorporated herein by reference in its entirety.

BACKGROUND

1. Field

The disclosure relates to a display apparatus, and more particularly, to a display apparatus including a board case with an enhanced closed structure.

2. Discussion of Related Art

Display apparatuses are devices for displaying images on a screen, such as televisions (TVs), monitors for computers, digital information displays, etc. More of the display apparatuses are installed for outdoor or exterior advertisement these days. For example, there is a billboard arranged outside a building to display an image.

Such outdoor display apparatuses may be directly exposed to contaminants such as rain water and dirty water outside, causing contamination and malfunctioning of e.g., a control circuit inside the display apparatus.

Hence, circuit boards of the display apparatus are required to be arranged in a board case having a closed structure to be protected against the rain water, dirty water, and the like.

SUMMARY

According to an aspect of the disclosure, a display apparatus includes a housing, a display module arranged inside the housing to display an image, a printed circuit board (PCB) connected to a plurality of cables provided to be electrically connected to the display module, a board case having a receiving space formed within the board case, the receiving space accommodating the PCB, and a cable clamp arranged on the board case to close a side of the receiving space, wherein the cable clamp includes a body, a first cut which is cut from a side of the body, a plurality of second cuts branched from an end of the first cut, and a plurality of through holes formed at one ends of the plurality of second cuts and passing through the body, each through hole having one of the plurality of cables inserted to and coupled with the through hole.

The body of the cable clamp may be formed of an elastic material to be elastically deformable.

The each through hole may include a close contact surface coming into tight contact with an outer circumferential surface of a corresponding cable.

The close contact surface may include at least one protruding rib protruding towards the corresponding cable.

The cable clamp may include a first contact surface and a second contact surface formed by the first cut, and the first contact surface and the second contact surface may come into tight contact with each other.

The first contact surface and the second contact surface may be formed to be orthogonal to one side cut by the first cut of the body.

The first contact surface and the second contact surface may be formed to have a slanted angle with the other side of the body neighboring to the one side of the body.

The first contact surface and the second contact surface may be formed to have a slanted angle with one side cut by the first cut of the body.

The board case may include a case body defining the receiving space and having a clamp installation groove formed on one side of the case body; and a case cover coupled with the case body and covering the clamp installation groove, and the cable clamp may be coupled with the clamp installation groove.

The cable clamp may be directly coupled with the case cover.

The cable clamp may further include at least one closing plug inserted to and coupled with the through hole.

Each of the at least one closing plug may include a plug part inserted to the through hole; and an elastic connector connecting the plug part to the body and being elastically deformable, and the body, the plug part, and the elastic connector may be integrally formed.

The second cut may be connected to an end of the first cut and may bend from the end of the first cut.

The plurality of through holes may have different diameters.

The body of the cable clamp may be formed of silicon having elasticity.

According to another aspect of the disclosure, a display apparatus includes a board case accommodating a printed circuit board (PCB), on which a plurality of electronic parts are mounted, to protect the PCB, wherein the board case includes a case body having a linkage path linked to inside of the board case for a cable extending from the PCB to pass through, and a cable clamp arranged in the linkage path and fixing the cable, and wherein the cable clamp includes a plurality of through holes coupled with the cable, and a plurality of cuts cutting inner sides of the plurality of through holes.

The plurality of cuts may be branched in pairs.

The plurality of cuts may be branched in sets, each set having three cuts.

According to an aspect of the disclosure, provided is a board case having a receiving space formed within the board case, the receiving space accommodating a printed circuit board (PCB) connected to a plurality of cables. The board case includes a body arranged on the board case to close a side of the receiving space, and formed of an elastic material, a first cut which is cut from a side of the body, a plurality of second cuts branched from an end of the first cut, and a plurality of through holes formed at one ends of the plurality of second cuts and passing through the body, each through hole having one of the plurality of cables inserted to and coupled with the through hole.

The board case may further include a closing plug connected to the body and inserted to the through hole.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 9 shows the cable clamp as shown in FIG. 5, to which cables and a closing plug are coupled to;

DETAILED DESCRIPTION OF EXEMPLARY EMBODIMENTS

Figure 1:
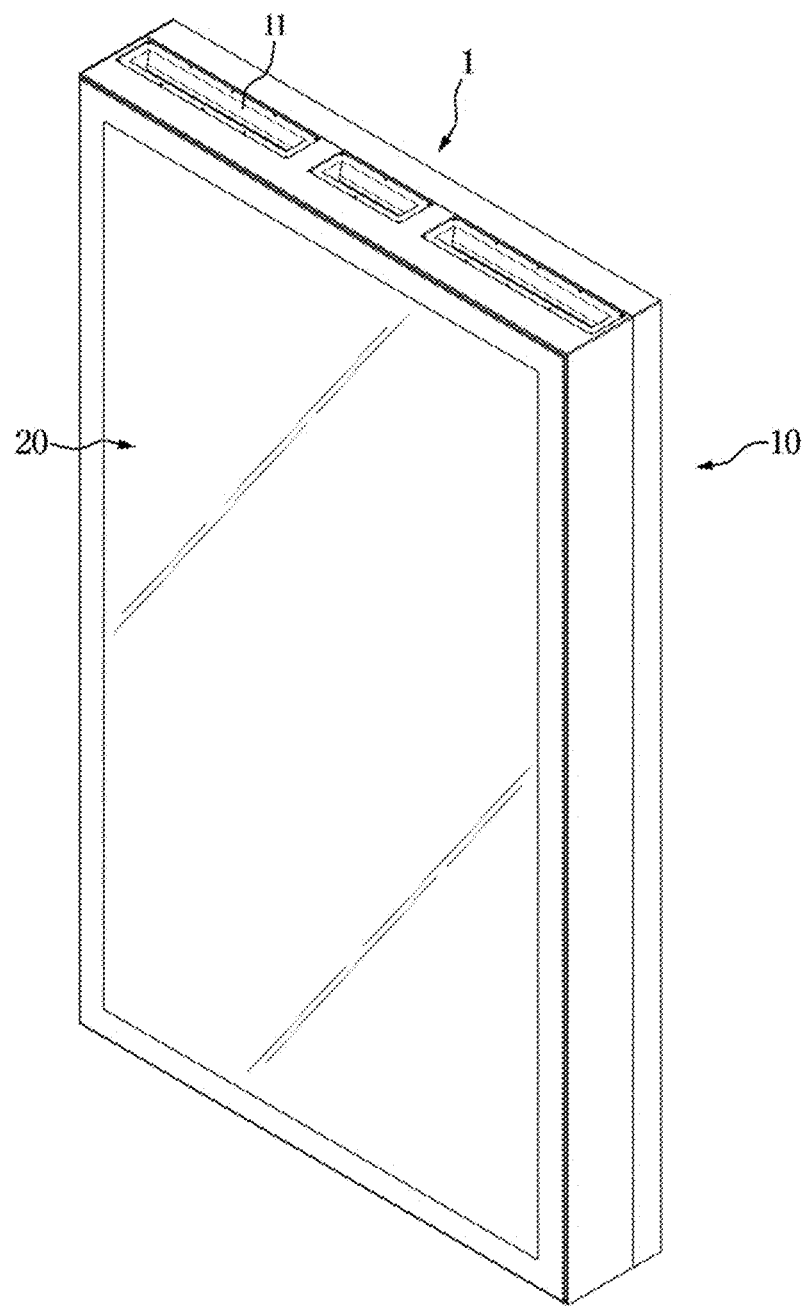
FIG. 1 shows a display apparatus, according to an embodiment of the disclosure.

Embodiments and features as described and illustrated in the disclosure are merely examples, and there may be various modifications replacing the embodiments and drawings at the time of filing this application.

Throughout the drawings, like reference numerals refer to like parts or components. For the sake of clarity, the elements of the drawings are drawn with exaggerated forms and sizes.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or chamber discussed below could be termed a second element, component, region, layer or section without departing from the teachings of the disclosure. Descriptions shall be understood as to include any and all combinations of one or more of the associated listed items when the items are described by using the conjunctive term "~ and/or ~," or the like.

The terms "upper", "lower", "top", and "bottom" as herein used are defined with respect to the drawings, but the terms may not restrict the shape and position of the respective components.

The disclosure provides a display apparatus including a board case with an enhanced closed structure.

The disclosure also provides a display apparatus including a board case equipped with a cable clamp for facilitating a work of fixing cables.

Reference will now be made in detail to embodiments of the disclosure, which are illustrated in the accompanying drawings, wherein like reference numerals refer to the like elements throughout.

Figure 2:
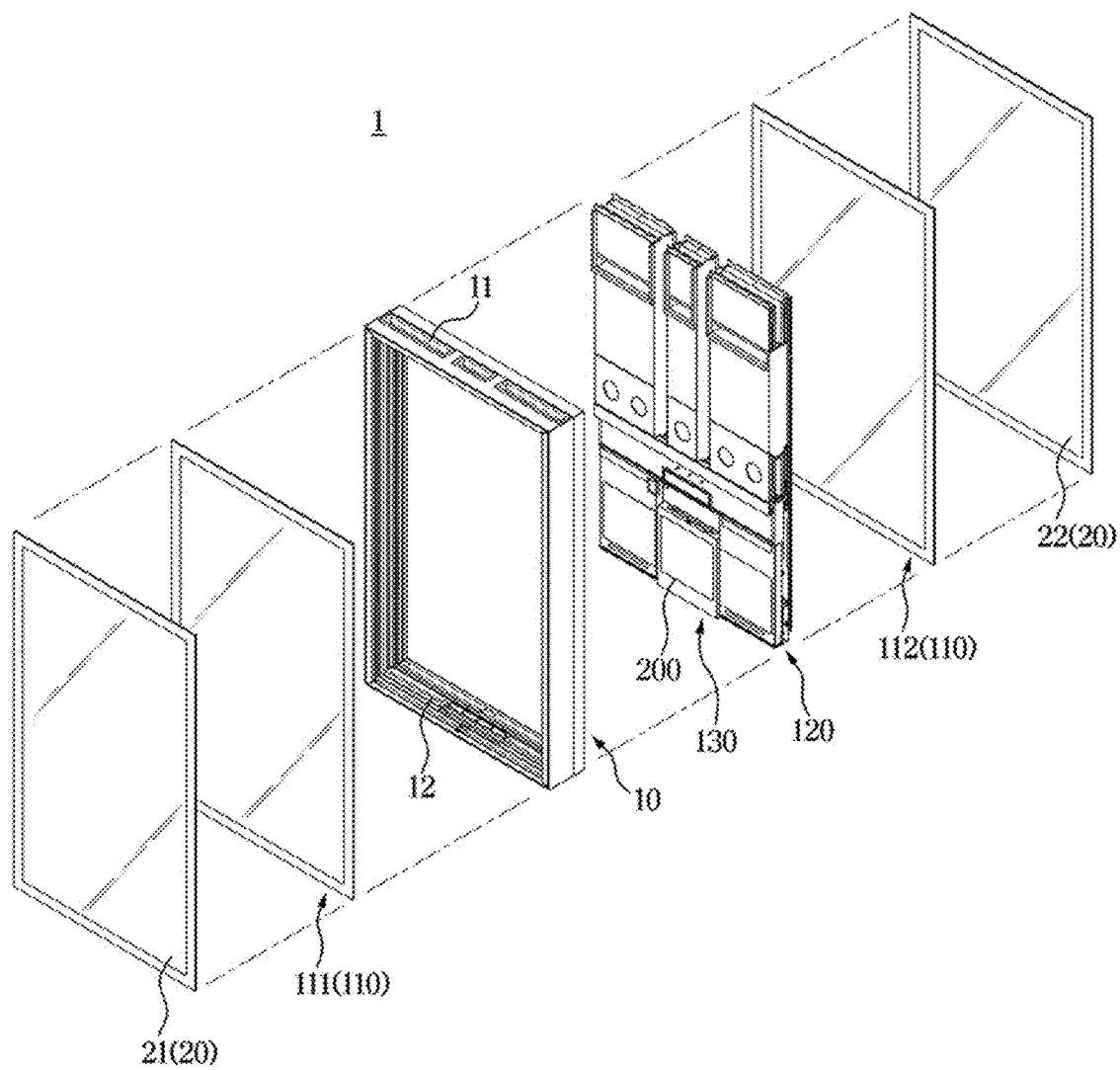
FIG. 2 is an exploded view of the display apparatus shown in FIG. 1.

FIG. 1 shows a display apparatus, according to an embodiment of the disclosure. FIG. 2 is an exploded view of the display apparatus shown in FIG. 1.

Although an outdoor display apparatus 1 is shown in FIG. 1 as an example, it is not limited thereto, and descriptions that follow may be equally applied to other various display apparatuses.

Referring to FIGS. 1 and 2, the display apparatus 1 may include a housing 10 that defines the external appearance of the display apparatus 1. The housing 10 may be provided for the display apparatus 1 to be installed outdoors. The housing 10 may be shaped like a box with front and rear sides open.

The housing 10 may include an inlet 11 and an outlet 12. The inlet 11 may be formed on the top side of housing 10, and the outlet 12 may be formed on the bottom side of the housing 10. The inlet 11 may include at least one hole formed to pass through the top side of the housing 10 to bring outside air into the housing 10. The outlet 12 may include at least one hole formed to pass through the bottom side of the housing 10 to discharge air, which has been brought into the housing 10, out of the housing 10. They are not limited thereto, and positions of the inlet 11 and the outlet 12 may be variously changed.

The display apparatus 1 may further include a protection glass 20 arranged to protect a display module 110. The protection glass 20 may be installed on each of the front side and the rear side of the housing 10. The protection glass 20 may be formed of a rigid and transparent material such as tempered glass, for protecting the display module 110 arranged on an inner side to the protection glass 20 and allowing an image displayed on the display module 110 to be seen from outside.

The protection glass 20 may include a first protection glass 21 arranged on the front side of the housing 10, and a second protection glass 22 arranged on the rear side of the housing 10. The protection glass 20 may have a size corresponding to the display module 110. Specifically, the protection glass 20 may be arranged to correspond to a display area of a display panel (not shown), on which images are displayed.

The display apparatus 1 may include a first display module 111 arranged to display an image in a forward direction of the housing 10, and a second display module 112 arranged to display an image in a rearward direction of the housing 10. The display apparatus 1 shown in FIG. 1 may be provided to display images in both directions on the front and rear sides. It is not, however, limited thereto, and the display apparatus 1 may include only the first display module 111 in another embodiment of the disclosure.

The first display module 111 may display content. The content may include a content received from the outside or a stored content. The first display module 111 may be arranged within the housing 10. The first display module 111 may be located behind the first protection glass 21. The first display module 111 may include a display panel for displaying an image, and a backlight unit (not shown) coupled onto the rear side of the display panel for irradiating light onto the display panel.

The second display module 112 may be arranged within the housing 10 and located behind the second protection glass 22. The second display module 112 may be arranged separately from the first display module 111. The second display module 112 has the same structure and function as the first display module 111 as described above, so the detailed description thereof will not be repeated.

The display apparatus 1 may further include a heat exchange module 120. The heat exchange module 120 may be arranged behind rear sides of the first and second display modules 111 and 112. The heat exchange module 120 may be arranged to receive and exchange heat from at least one of the first and second display modules 111 and 112. The heat exchange module 120 may be coupled with the first and second display modules 111 and 112 to receive heat therefrom in a heat conduction method.

The heat exchange module 120 may be arranged behind the rear sides of the first and second display modules 111 and 112 to make heat inside the housing 10 dissipate at the rear sides of the first and second display modules 111 and 112. In this case, the heat inside the housing 10 may be generated from at least one of the first display module 111, the second display module 112, or a control module 130. Besides, the heat inside the housing 10 may be generated by sun rays incident on the display apparatus 1. The heat inside the housing 10 may be concentrated into the heat exchange module 120.

The display apparatus 1 may further include the control module 130. The control module 130 may be arranged in the housing 10 for driving the first and second display modules 111 and 112.

The control module 130 may be located underneath the heat exchange module 120 in a vertical direction. As the control module 130 and the heat exchange module 120 are arranged on a vertical plane, the display apparatus 1 may be implemented in a slim design. It is not, however, limited thereto, and the control module 130 may be arranged on top of or on a side of the heat exchange module 120.

The control module 130 may include at least one printed circuit board (PCB) on which a plurality of electronic parts 132 for operating at least one of the first or second display module 111 or 112 are mounted. That is, the PCB 131 may include a plurality of electronic parts 132. The control module 130 may include at least one cable 140 for connecting the PCB 131 to the first display module 111 and/or at least one cable 140 for connecting the PCB 131 to the second display module 112. The at least one electric part 132 may include a control processing unit (CPU), a switching mode power supply (SMPS), an LD, etc., which exchange information with one another and perform respective functions.

However, it is not limited thereto. The PCB 131 may also control a different configuration including the heat exchange module 120, in which case there may be a cable 140 connecting the heat exchange module 120 to the different configuration.

The control module 130 may include a board case 200 provided to protect the at least one PCB 131. The control module 130 may include one or multiple board cases 200. The board case 200 may be arranged underneath the heat exchange module 120. The board case 200 may be coupled to the heat exchange module 120 with fastening members e.g., screws.

Figure 3:
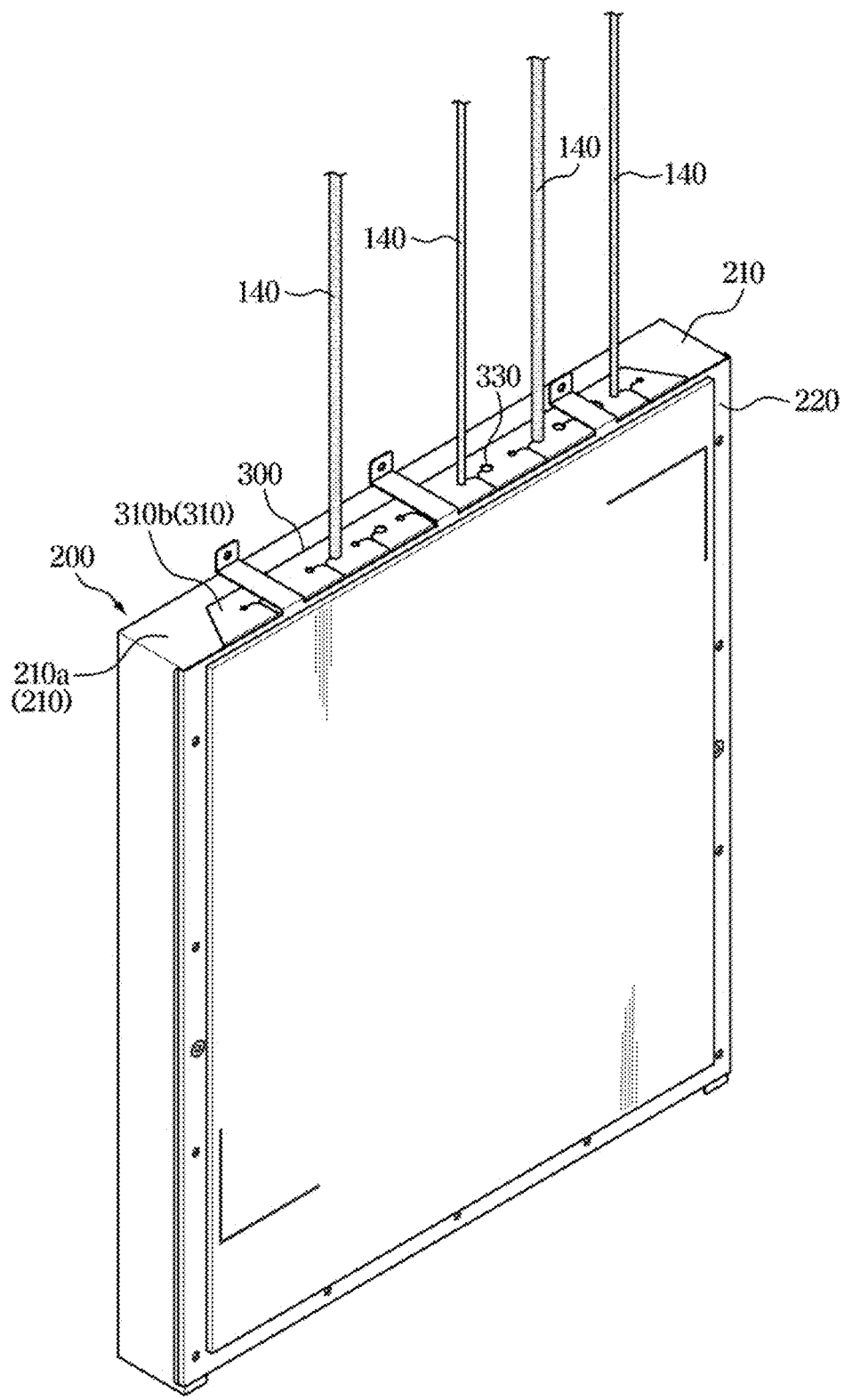
FIG. 3 is a perspective view of a board case equipped in the display apparatus shown in FIG. 1.
Figure 4:
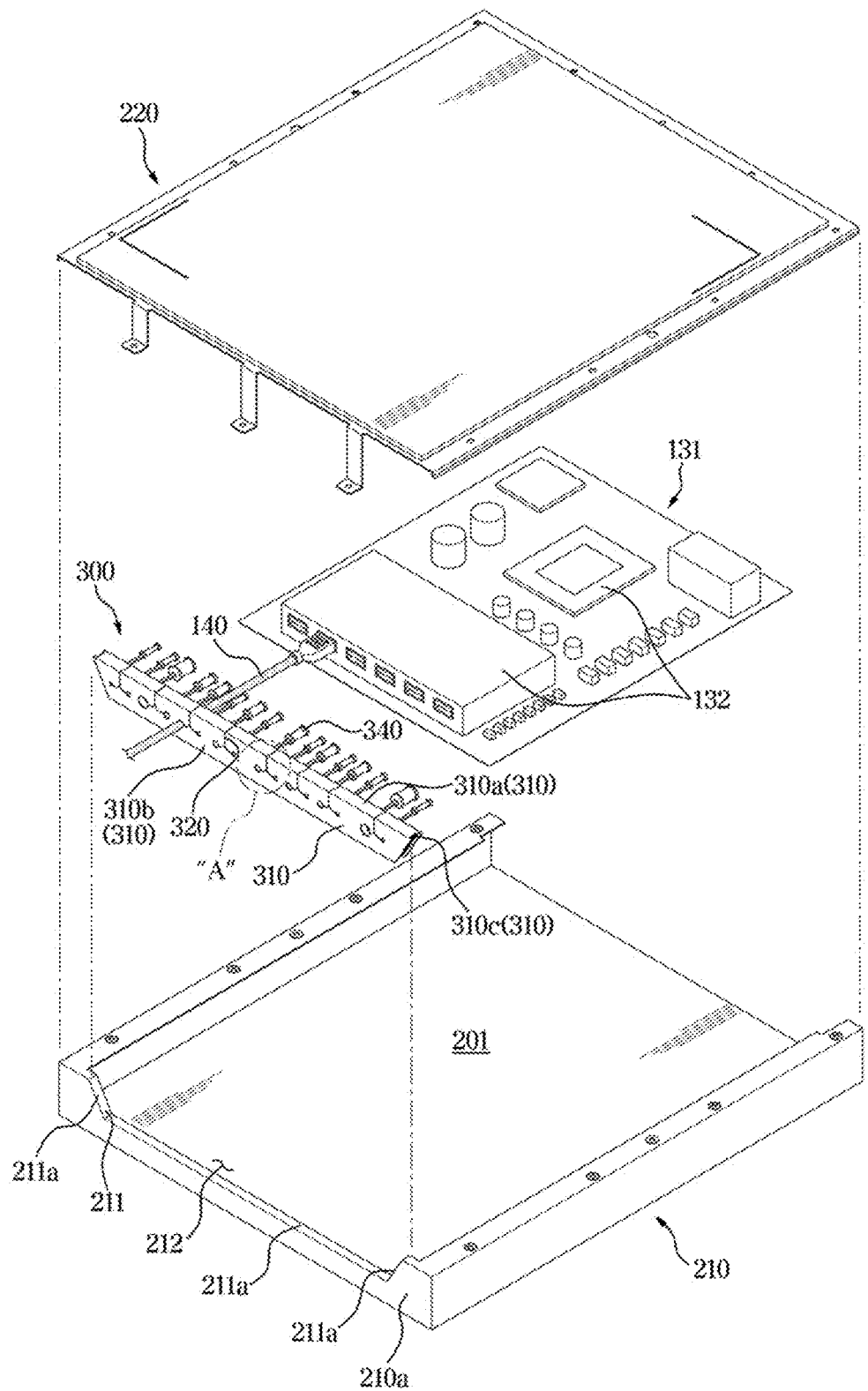
FIG. 4 is an exploded view of the board case shown in FIG. 3.
Figure 5:
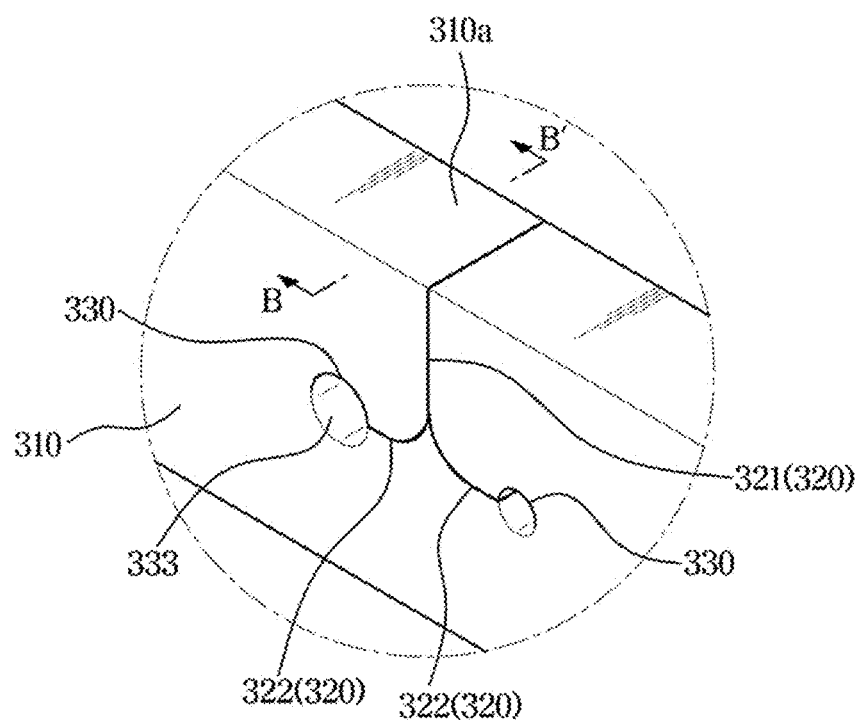
FIG. 5 is an enlarged view of portion A of a cable clamp shown in FIG. 4.
Figure 6:
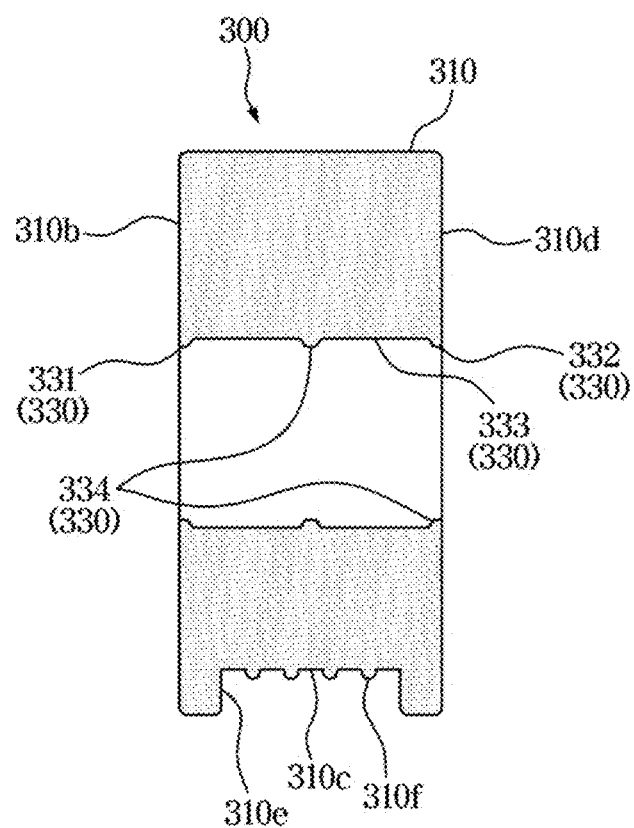
FIG. 6 is a cross-sectional view along line B-B' shown in FIG. 5.
Figure 8:
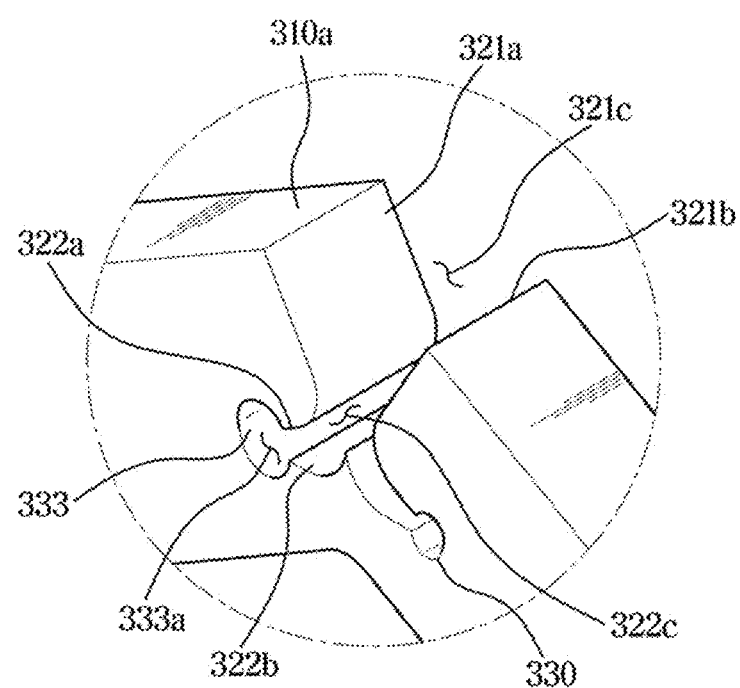
FIG. 8 shows cuts and through holes as shown in FIG. 5 being deformed due to deformation of a body of the cable clamp.
Figure 9:
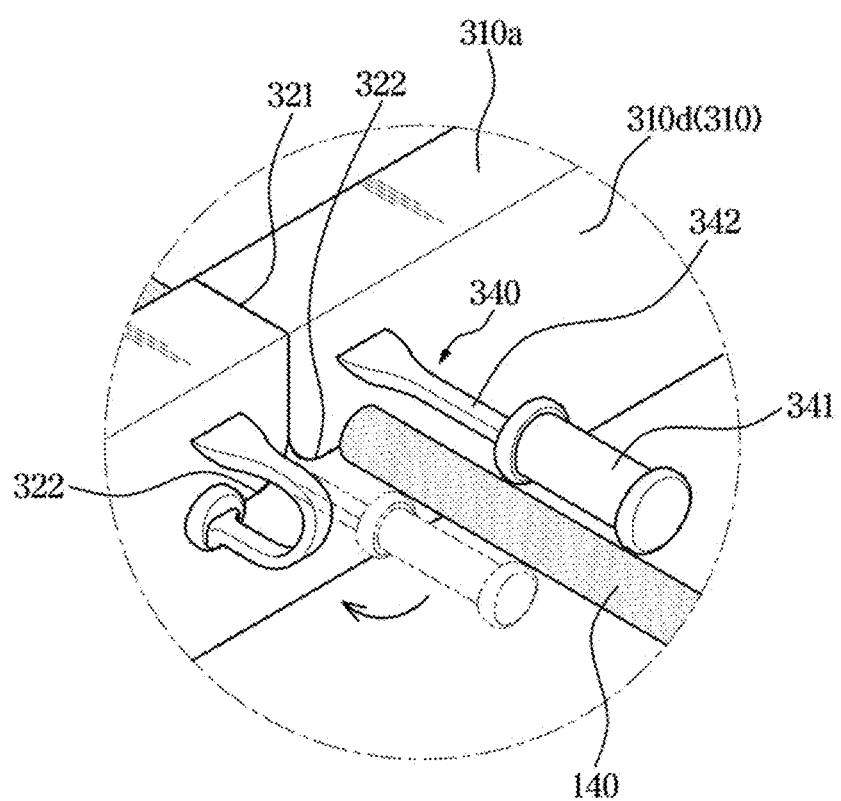

FIG. 3 is a perspective view of the board case 200 equipped in the display apparatus 1 shown in FIG. 1. FIG. 4 is an exploded view of the board case 200 shown in FIG. 3. FIG. 5 is an enlarged view of portion A of a cable clamp shown in FIG. 4. FIG. 6 is a cross-sectional view along line B-B' shown in FIG. 5. FIG. 8 shows cuts and through holes as shown in FIG. being deformed due to deformation of a body of the cable clamp. FIG. 9 shows the cable clamp as shown in FIG. 5, to which cables and a closing plug are coupled to.

Referring to FIGS. 3 to 6 and 8 and 9, the board case 200 may have a receiving space 201 formed inside, which may receive the PCB 131, to protect the PCB 131 against external moisture or dirty water. A portion or all of the cable 140 connected to the PCB 131 may be received in the receiving space 201 of the board case 200, and a portion of the cable 140 received in the receiving space 201 may extend from the inside of the board case 200 to the outside.

The board case 200 may include a case body 210 defining the receiving space 201 and having one side open, and a case cover 220 coupled to the one side of the case body 210 to cover the receiving space 201. The case body 210 and the case cover 220 may be coupled to each other by common fastening members, such as an adhesive, screws, etc.

The case body 210 may include a clamp installation groove 211 formed on a top side 210*a* of the case body 210 to form a linkage path to link external space of the board case 200 to the receiving space 201 in the board case 200. The cables 140 received in the receiving space 201 may be drawn out of the board case 200 through the linkage path 212. The case cover 220 may cover a side of the clamp installation groove 211. Specifically, the case cover 220 may cover the linkage path 212.

The board case 200 may include a cable clamp 300 for closing a side of the receiving space 201 to prevent moisture or dirty water from outside of the board case 200 from passing through the linkage path 212, and thus avoid contamination of the PCB 131, and fixing the cables 140 extending from inside of the board case 200 to outside of the board case 200 in an untangled and arranged state.

The cable clamp 300 may include a body 310, a plurality of cuts 320 cutting a side of the body 310, and a plurality of through holes 330 passing through the body 310 and having the inner side cut by the cuts 320. The body 310 of the cable clamp 300 may be formed of an elastic material such as silicon, rubber, etc., and is elastically deformable.

The cable clamp 300 may be coupled to the case body 210. Specifically, the cable clamp 300 may be inserted and coupled to the clamp installation groove 211 formed at the case body 210. In other words, the cable clamp 300 may be coupled to the case body 210 while being arranged in the linkage path 212. The clamp installation groove 211 may have a shape corresponding to the shape of the body 310 of the cable clamp 300.

The cable clamp 300 may be arranged between the case body 210 and the case cover 220 by being inserted and coupled to the clamp installation groove 211; a side 310*a* of the cable clamp 300 may be coupled to the case cover 220, and other sides 310*c* of the cable clamp 300 may be coupled to inner sides 211*a* of the clamp installation groove 211 of the case body 210. Specifically, the sides 310*c* of the body 310 corresponding to the inner sides 211*a* of the clamp installation groove 211 may be directly and water-tightly bonded to the inner sides 211*a* of the clamp installation groove 211 e.g., by a silicon adhesive.

More specifically, the body 310 of the cable clamp 300 may have a coupling groove 310*e* formed on an outer side to be coupled with the clamp installation groove 211, and the sides 310*c* of the body 310 may correspond to a side of the coupling groove 310*e*. The inner sides 211*a* of the clamp installation groove 211 may be inserted to the coupling groove 310*e*, and may be bonded to the sides 310*c* of the body 310 by e.g., a silicon adhesive. The sides 310*c* of the body 310 may include at least one coupling rib 310*f* arranged for the adhesive to be spread without clumping. As such, as the inner sides 211a of the cable installation groove 211 are inserted and then bonded to the coupling groove 310e, moisture or dirty water may be effectively prevented from being brought in through the bonded portion.

In addition, the side 310a of the body 310 opposite the case cover 220 may be directly and water-tightly bonded to the case cover 220 by e.g., a silicon adhesive. The side 310a of the body 310 opposite the case cover 220 may correspond to the side 310a cut by the cuts 320. However, the process in which the side 310a of the body 310 opposite the case cover 220 is bonded to the case cover 220 by e.g., a silicon adhesive, may be omitted, but the side 310a of the body 310 opposite the case cover 220 may come into contact with the case cover 220.

The cuts 320 may include a plurality of first cuts 321 cut from the side 310a of the body 310, and a plurality of second cuts 322 branched from an end of each of the first cuts 321. The first cut 321 and the second cuts 322 may be connected, and the second cuts 322 may have the form of being bended from the end of the first cut 321.

A single first cut 321 may be connected to two second cuts 322 at an end. In other words, the two second cuts 322 may be branched in pair. The two second cuts 322 branched from the end of the first cut 321 may be bended in opposite directions.

Figure 7:
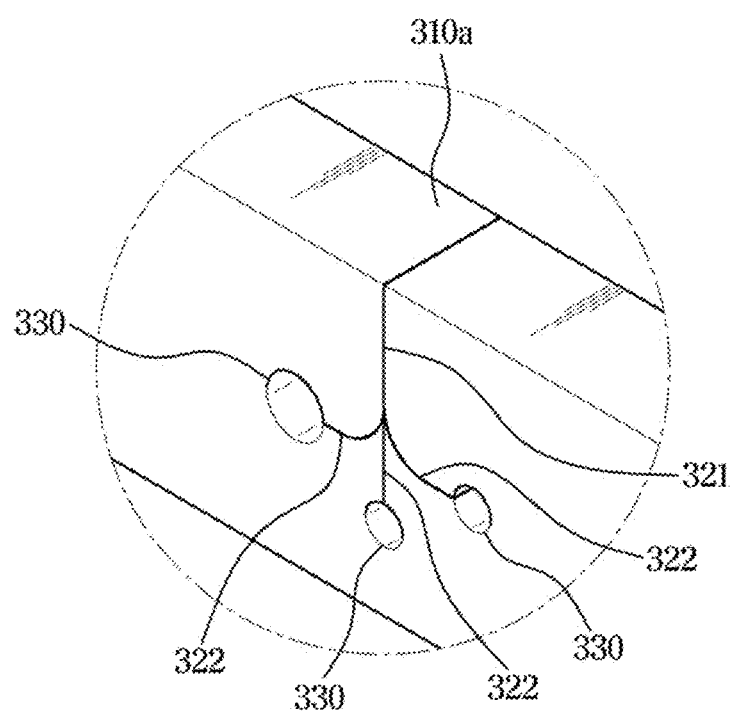
FIG. 7 shows cuts and through holes of a cable clamp of a display apparatus, according to an embodiment of the disclosure.

However, it is not limited thereto. FIG. 7 shows cuts and through holes of a cable clamp of a display apparatus, according to an embodiment of the disclosure. Descriptions overlapping the foregoing will not be repeated. Referring to FIG. 7, three of the second cuts 322 may be connected to the end of one of the first cuts 321. In other words, the three second cuts 322 may be branched in a set. Two of the three second cuts 322 branched from the end of the first cut 321 may be bended in opposite directions, and the remaining second cut may run straight from the end of the first cut 321 between the two second cuts bended in the opposite directions. What will be described below will be equally applied to the cable clamp shown in FIG. 7.

Turning back to FIGS. 3 to 6, 8 and 9, the plurality of through holes 330 may be formed to pass through the body 310 at the other end of the plurality of second cuts 322, each through hole 330 coupled to one of the plurality of cables 140. In other words, a through hole 330 may be formed at the other end of a second cut 322, and a cable 140 may be coupled to a through hole 330.

The cable 140 may pass through the body 310 of the cable clamp 300 by being inserted to the through hole 330, and may be fixed to the cable clamp 300 while being arranged in an untangled state. The plurality of through holes 330 may have different inner diameters to fit the respective cables 140.

In this way, there may be a small number of first cuts 321 cutting the one side of the body 310 as compared to the number of the through holes 330, thereby minimizing the chances of cutting the one side of the body 310 and thus preventing reduction in elasticity of the body 310 due to frequent cuttings.

The through hole 330 may include a round first opening 331 formed on a top side 310b of the body 310, which is exposed to the outside, a round second opening 332 formed on a bottom side 310d of the body 310, and an inner surface 333 passing through the body 310 to connect the first opening 331 to the second opening 332. A cavity formed by the through hole 330 passing through the body 310 and enclosed by the inner surface 333 of the through hole 330 may have a cylindrical shape. The through hole 330 may link the outside of the board case 200 to the receiving space 201.

However, it is not limited thereto. Although the cavity formed by the through hole 330 passing through the body 310 and enclosed by the inner surface 333 of the through hole 330 has the shape of a cylinder on the assumption that the cable 140 has a round cross-section, the cavity may have different shapes depending on the cross-section of the cable 140. Each of the through holes 330 may include a close contact surface 333 that may tightly contact an outer circumferential surface of the cable 140. The close contact surface 333 may correspond to the inner surface 333 of the through hole 330. The close contact surface 333 may have a portion cut by the second cut 322.

The close contact surface 333 may include at least one protruding rib 334 protruding towards the outer circumferential surface of the cable 140. Specifically, the protruding rib 334 may have the shape of a ring to enclose the outer circumferential surface of the cable 140. The protruding rib 334 may tightly contact the outer circumferential surface of the cable 140. When the protruding rib 334 comes into tight contact with the outer circumferential surface of the cable 140, a contact area between the close contact surface 333 and the outer circumferential surface of the cable 140 is smaller than when there is no protruding rib 334, thereby minimizing interference in tight contact of the close contact surface 333 with the outer circumferential surface of the cable 140 due to bending of the cable 140 or unevenness of the outer circumferential surface of the cable 140.

The body 310 may be formed of an elastic material, and may thus be deformable. Accordingly, the body 310 may be elastically deformed such that the first cut 321 and the second cut 322 are opened.

Specifically, the first cut 321 may be opened to form a first contact surface 321a and a second contact surface 321b, which correspond to each other. The first contact surface 321a and the second contact surface 321b may come into tight contact with each other unless the body 310 is elastically deformed. The body 310 may be elastically deformed, so that the first cut 321 is opened and thus the first contact surface 321a and the second contact surface 321b are separated and get away from each other.

When the body 310 is elastically deformed, causing the first cut 321 to be opened and the first contact surface 321a and the second contact surface 321b to be separated and get away from each other, the second cut 322 may be opened as well. A third contact surface 322a and a fourth contact surface 322b, which correspond to each other, may be formed by the second cut 322. The third contact surface 322a and the fourth contact surface 322b may come into tight contact with each other unless the body 310 is deformed, and when the body 310 is elastically deformed so that the first contact surface 321a and the second contact surface 321b are separated and get away from each other, the third contact surface 322a and the fourth contact surface 322b may also be separated and get away from each other.

The close contact surface 333 of the through hole 330 is cut by the second cut 322, so a cut end of the close contact surface 333 may be connected to the third contact surface 322a and the other cut end of the close contact surface 333 may be connected to the fourth contact surface 322b. When the third contact surface 322a and the fourth contact surface 322b are separated due to deformation of the body 310, a portion cut by the second cut 322 may be opened. In other words, the one end of the close contact surface 333 connected to the third contact surface 322a and the other end of the close contact surface 333 connected to the fourth contact surface 322b may get away from each other.

As such, when the body 310 is elastically deformed, a gap 321c may be formed between the first contact surface 321a and the second contact surface 321b, and a gap 322c may also be formed between the third contact surface 322a and the fourth contact surface 322b. A gap 333a may be formed between the end of the close contact surface 333 connected to the third contact surface 322a and the other end of the close contact surface 333 connected to the fourth contact surface 322b, and the gap 333a may be linked to the gap 322c formed between the third contact surface 322a and the fourth contact surface 322b.

The cable 140 may be arranged through the through hole 330 by passing, one by one, the gap 321c formed between the first contact surface 321a and the second contact surface 321b, the gap 322c formed between the third contact surface 322a and the fourth contact surface 322b, and the gap 333a formed between the end of the close contact surface 333 connected to the third contact surface 322a and the other end of the close contact surface 333 connected to the fourth contact surface 322b. In other words, the body 310 may be elastically deformed so that the first cut 321 and the second cut 322 are opened, and the cable 140 may be arranged through the through hole 330 with one side opened by sequentially passing through the first cut 321 and the second cut 322.

Even when an end of the cable 140 has a greater diameter than a diameter of the through hole 330, or an end of the cable 140 is coupled to the display module 110 or the PCB 131, making it impossible for the cable 140 to be inserted to the through hole 330 from the end of the cable 140 through the first opening 331 or the second opening 332, the cable 140 may be arranged through the through hole 330 by inserting any other portion than the end of the cable 140 to the through hole 330 through the cuts 320, thereby making it easy to fix the cable 140 to the cable clamp 300.

After the body 310 is elastically deformed and the cable 140 is inserted to the through hole 330, the body 310 may be returned to its original form. As the body 310 is restored, the through hole 330 may enclose the outer circumferential surface of the inserted cable 140, the third contact surface 322a and the fourth contact surface 322ba come into close contact with each other again, and the first contact surface 321a and the second contact surface 321b come into close contact with each other again. The close contact surface 333 of the through hole 330 comes into tight contact with the outer circumferential surface of the cable 140.

Specifically, the close contact surface 333 and the outer circumferential surface of the cable 140 may make so tight contact with each other that no moisture passes between the close contact surface 333 and the outer circumferential surface of the cable 140; the third contact surface 322a and the fourth contact surface 322b may make so tight contact with each other that no moisture passes between the third contact surface 322a and the fourth contact surface 322b; the first contact surface 321a and the second contact surface 321b may make so tight contact with each other that no moisture passes between the first contact surface 321a and the second contact surface 321b.

Accordingly, the cable clamp 300 having the body 310 returned to its original form with the cable 140 inserted thereto is coupled with the cable installation groove 211, thereby preventing external moisture or dirty water from passing through to the receiving space 201 through the linkage path 212 through which to draw out the cable 140.

The first contact surface 321a and the second contact surface 321b may be orthogonal to the side 310a of the body 310 cut by the first cut 321.

Figure 10:
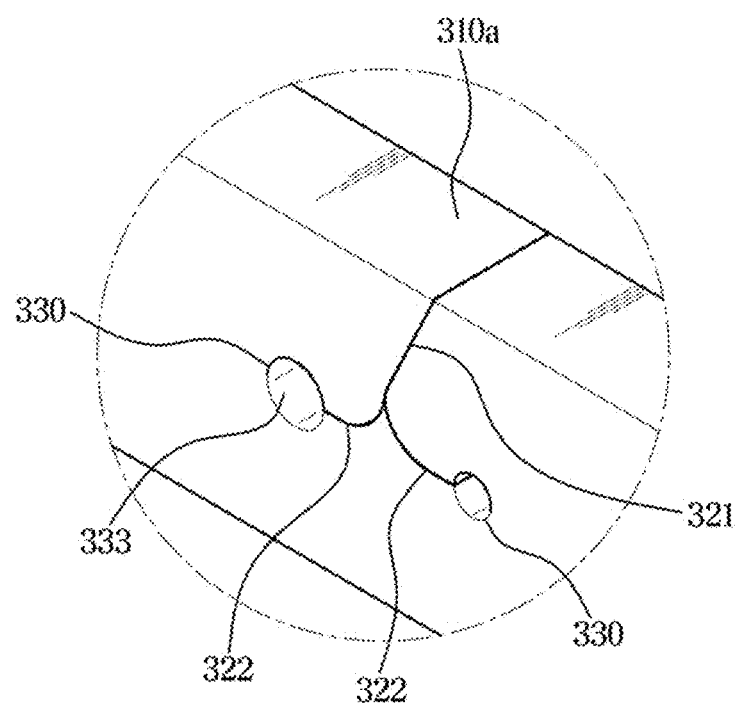
FIG. 10 shows cuts and through holes of a cable clamp of a display apparatus, according to another embodiment of the disclosure.
Figure 11:
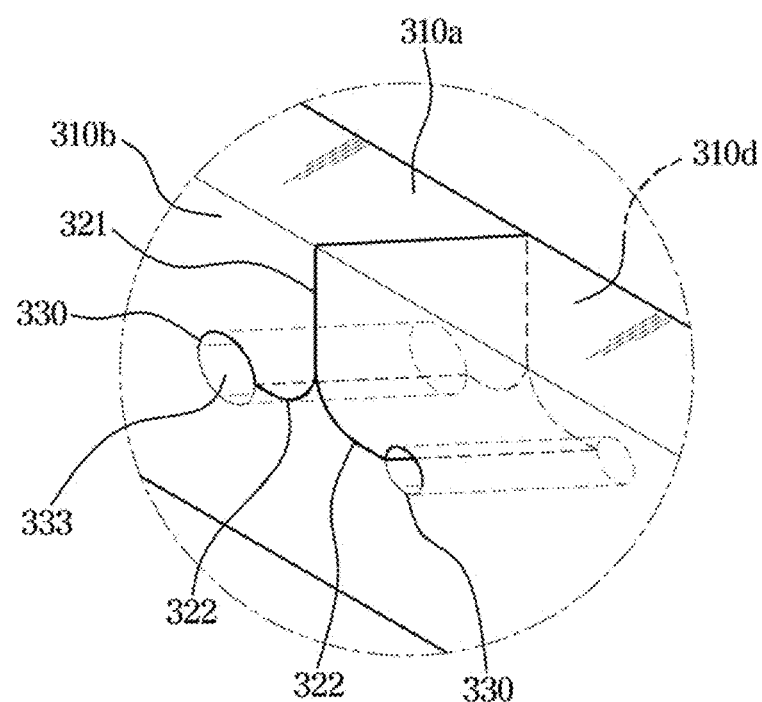
FIG. 11 shows cuts and through holes of a cable clamp of a display apparatus, according to another embodiment of the disclosure.

However, it is not limited thereto. FIG. 10 shows cuts and through holes of a cable clamp of a display apparatus, according to another embodiment of the disclosure. FIG. 11 shows cuts and through holes of a cable clamp of a display apparatus, according to another embodiment of the disclosure. Descriptions overlapping the foregoing will not be repeated.

Referring to FIG. 10, the first contact surface 321a and the second contact surface 321b may be slanted from the side 310a of the body 310 cut by the first cut 321. This may increase a contact area between the first contact surface 321a and the second contact surface 321b, enabling the first contact surface 321a and the second contact surface 321b to contact each other more stably.

In another example, referring to FIG. 11, the first contact surface 321a and the second contact surface 321b may be orthogonal to the side 310a of the body 310 cut by the first cut 321 while forming a slanted angle from the top side 310b or the bottom side 310d that is perpendicular to the cut side 310a of the body 310. In this case, the third contact surface 322a, the fourth contact surface 322b, and the through hole 330 may also be formed to be slanted from the top side 310b or the bottom side 310d of the body 310.

This may increase a contact area between the first contact surface 321a and the second contact surface 321b, enabling them to tightly contact each other more stably, and increase areas of the contact surfaces 321a and 321b, across which external moisture or dirty water needs to move to flow into the board case 200 from the top surface 310b of the body 310 exposed to the outside, thereby more efficiently preventing the external moisture or dirty water from passing through. What will be described below will be equally applied to the cable clamp shown in FIG. 11.

The cable clamp 300 may include at least one closing plug 340 coupled to the through hole 330. The closing plug 340 may include a plug part 341 inserted to the through hole 330, and an elastic connector 342 connecting the plug part 341 to the body 310 and being elastically deformable. The plug part 341, the elastic connector 342, and the body 310 may be integrally formed. Specifically, the closing plug 340 may be connected to the bottom side 310d of the body 310. The plug part 341 integrally formed with the body 310 may be prevented from being separately purchased or missed.

The plug part 341 of the closing plug 340 may be inserted to the through hole 330 through the first opening 331 or the second opening 332 of the through hole 330, or may be inserted to the through hole 330 by sequentially passing through the opened first cut 321 and opened second cut 322, as in the case of the cable 140.

The plug part 341 may have a cylindrical shape with a diameter corresponding to a diameter of the through hole 330. It is not, however, limited thereto, and the plug part 341 may have a shape corresponding to a shape of the cavity enclosed by the close contact surface 333. A plurality of closing plugs 340 may include plug parts 341 having different external diameters. The plug part 341 may be shifted closer to the through hole 330 as the elastic connector 342 is elastically deformed, and the plug part 341 may be inserted to and water-tightly coupled with the through hole 330.

When some of the plurality of through holes 330 have the cables 140 inserted thereto and the remaining through holes 330 do not have any cable inserted thereto, the closing plug 340 may be inserted to each of the remaining through holes 330 with no cables inserted thereto. Accordingly, all the through holes of the cable clamp 300 may be coupled with one of the cable 140 or the closing plug 340, so all the through holes 330 may be water-tightly closed, thereby preventing external water from passing through the through hole 330.

According to the disclosure, a display apparatus may include a cable clamp having a waterproof effect to seal a side of a receiving space of a board case, thereby preventing contaminants such as rain water or dirt from being brought into the receiving space and contaminating a PCB.

Furthermore, the cable clamp may facilitate a work of fixing cables by allowing the cables to be inserted and fixed to the cable clamp through cuts of the cable clamp.

Several embodiments of the disclosure have been described above, but a person of ordinary skill in the art will understand and appreciate that various modifications can be made without departing the scope of the disclosure. Thus, it will be apparent to those ordinary skilled in the art that the true scope of technical protection is only defined by the following claims.

What is claimed is:

1. A display apparatus comprising:
   a housing;
   a display module arranged inside the housing to display an image;
   a printed circuit board (PCB) connectable to a plurality of cables provided to be electrically connected to the display module;
   a board case having a receiving space formed to accommodate the PCB within the board case, the receiving space having an open side; and
   a cable clamp arranged on the board case and formed to close the open side of the receiving space,
   wherein the cable clamp includes:
     a body,
     a first cut on a side of the body,
     a plurality of second cuts on the side of the body that are branched from an end of the first cut, and
     a plurality of through holes formed such that each through hole of the plurality of through holes is at an end of a second cut of the plurality of second cuts further from the end of the first cut from which the plurality of second cuts are branched, each through hole of the plurality of through holes passing through the body such that one of the plurality of cables is insertable into and coupleable with each through hole of the plurality of through holes.

2. The display apparatus of claim 1, wherein the body of the cable clamp is formed of an elastic material to be elastically deformable.

3. The display apparatus of claim 2, wherein each through hole of the plurality of through holes includes a close contact surface to come into tight contact with an outer circumferential surface of a corresponding cable among the plurality of cables.

4. The display apparatus of claim 3, wherein the close contact surface includes at least one protruding rib protruding towards the corresponding cable.

5. The display apparatus of claim 3, wherein the cable clamp includes a first contact surface and a second contact surface formed by the first cut, and
   wherein the first contact surface and the second contact surface come into tight contact with each other.

6. The display apparatus of claim 5, wherein the first contact surface and the second contact surface are formed to be orthogonal to the side of the body cut by the first cut.

7. The display apparatus of claim 6, wherein the first contact surface and the second contact surface are formed to have a slanted angle with between sides of the body neighboring the one side of the body.

8. The display apparatus of claim 5, wherein the first contact surface and the second contact surface are formed to have a slanted angle with the side of the body cut by the first cut.

9. The display apparatus of claim 1, wherein the board case includes:
   a case body defining the receiving space and having a clamp installation groove formed on one side of the case body; and
   a case cover coupleable with the case body to cover the clamp installation groove,
   wherein the cable clamp is coupled with the clamp installation groove.

10. The display apparatus of claim 9, wherein the cable clamp is directly coupled with the case cover.

11. The display apparatus of claim 2, wherein the cable clamp further includes at least one closing plug insertable into and coupleable with each through hole of the plurality of through holes.

12. The display apparatus of claim 11, wherein each of the at least one closing plug includes:
   a plug part insertable into each through hole of the plurality of through holes; and
   an elastic connector to connect the plug part to the body, the elastic connector being elastically deformable,
   wherein the body, the plug part, and the elastic connector are integrally formed.

13. The display apparatus of claim 1, wherein at least some second cuts of the plurality of second cuts are connected to the end of the first cut and bent from the end of the first cut.

14. The display apparatus of claim 1, wherein some through holes of the plurality of through holes have different diameters.

15. The display apparatus of claim 2, wherein the body of the cable clamp is formed of silicon having elasticity.

16. A display apparatus comprising:
   a board case to accommodate and protect a printed circuit board (PCB), on which a plurality of electronic parts are mounted,
   wherein the board case includes:
     a case body having a linkage path linked to an inside of the board case for a cable extending from the PCB to pass through, and
     a cable clamp arranged in the linkage path to fix the cable, and
   wherein the cable clamp includes:
     a plurality of through holes coupleable with the cable,
     a first cut that is cut from a side of the cable clamp, and
     a plurality of second cuts branched from an end of the first cut such that each second cut of the plurality of second cuts ends on an inner side of one through hole of the plurality of through holes.

17. The display apparatus of claim 16, wherein the plurality of second cuts are branched in pairs.

18. The display apparatus of claim 16, wherein the plurality of second cuts are branched in sets, each set having three second cuts.

19. A board case having a receiving space formed to accommodate a printed circuit board (PCB) which is connectable to a plurality of cables, the board case comprising:

a body arranged on the board case to close an open side of the receiving space, the body being formed of an elastic material;
a first cut on a side of the body;
a plurality of second cuts on the side of the body that are branched from an end of the first cut; and
a plurality of through holes formed such that each through hole of the plurality of through holes is at an end of a second cut of the plurality of second cuts further from the end of the first cut from which the plurality of second cuts are branched, each through hole of the plurality of through holes passing through the body such that one of the plurality of cables is insertable into and coupleable with each through hole of the plurality of through holes.

20. The board case of claim 19, wherein the board case further includes a closing plug connectable to the body and insertable into each through hole of the plurality of through holes.

\* \* \* \* \*